US006654978B2

(12) United States Patent
Bouchard

(10) Patent No.: US 6,654,978 B2
(45) Date of Patent: Dec. 2, 2003

(54) SNOW REMOVING DEVICE

(76) Inventor: Germain Bouchard, 5565, Irving, St-Hubert, Québec (CA), J3Y 1H2

( * ) Notice: Subject to any disclaimer, the term of this patent is extended or adjusted under 35 U.S.C. 154(b) by 211 days.

(21) Appl. No.: 09/819,661

(22) Filed: Mar. 29, 2001

(65) Prior Publication Data
US 2001/0027584 A1 Oct. 11, 2001

(30) Foreign Application Priority Data
Apr. 5, 2000 (GB) .............................................. 0008202

(51) Int. Cl.[7] ................................................. B60S 3/04
(52) U.S. Cl. ............................ 15/3; 15/97.3; 15/DIG. 2
(58) Field of Search ............................ 15/3, 53.1, 53.3, 15/97.3, DIG. 2, 93.1

(56) References Cited
U.S. PATENT DOCUMENTS
5,802,654 A * 9/1998 Yeaglin
5,989,356 A * 11/1999 Candeletti

* cited by examiner

Primary Examiner—Randall E. Chin

(57) ABSTRACT

A snow removing device for removing snow and ice from the roof of semi-trailers, vans and similar vehicles. The snow removing device includes; a scraping blade slidably mounted for vertical movement between spaced apart vertical frame posts. A mechanism is provided for automatically adjusting the position of the scraping blade relative to the vehicle's roof so as to maintain a predetermined blade spacing between the blade lower peripheral edge and the vehicle's roof in order to prevent the scraping blade from damaging structures protruding from the vehicle's roof. A resilient skirt extends from the scraping blade so as to fill the spacing thereunderneath and so as to contact the vehicle's roof. A mechanism is also provided for adjusting the amount of pressure exerted by the scraping blade and resilient skirt on the vehicle's roof depending on the consistency of the snow being scraped. A breaking assembly is further provided for breaking slabs of hardened snow and ice supported on the vehicle's roof. A mechanism is provided for adjusting the height of the breaking assembly. Another mechanism is provided for adjusting the pressure exerted by the breaking assembly on the vehicle's roof.

20 Claims, 8 Drawing Sheets

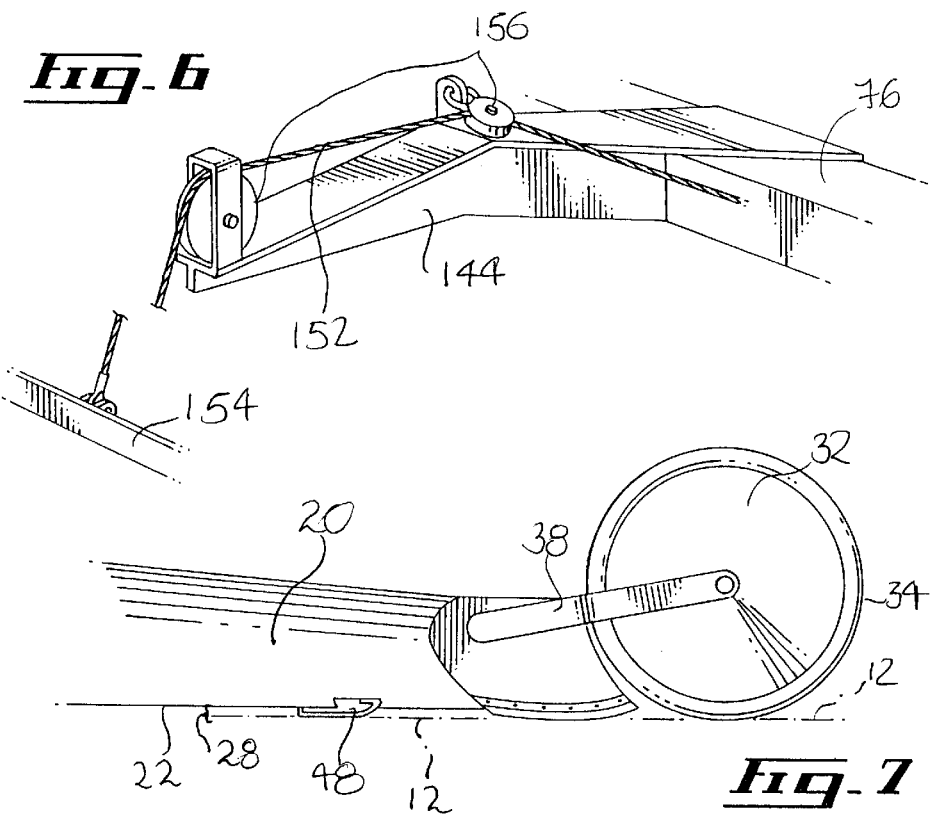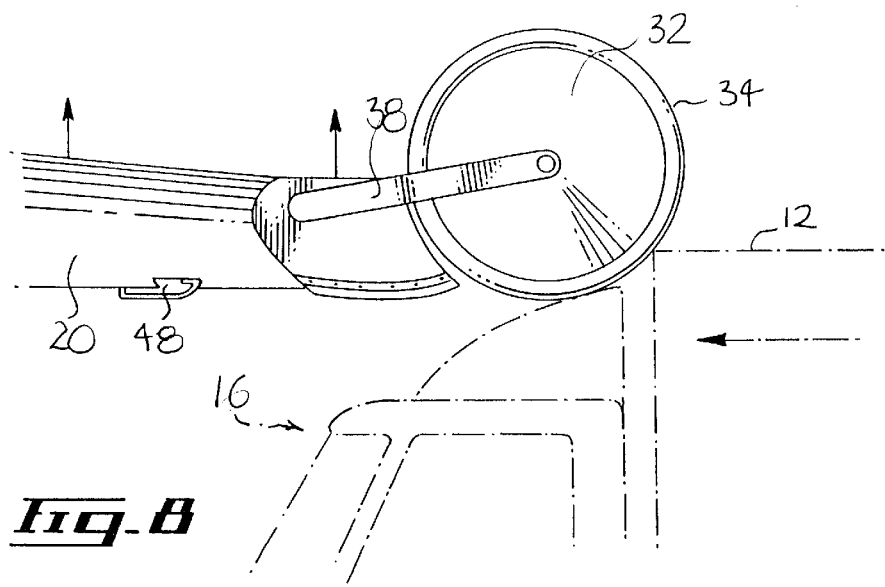

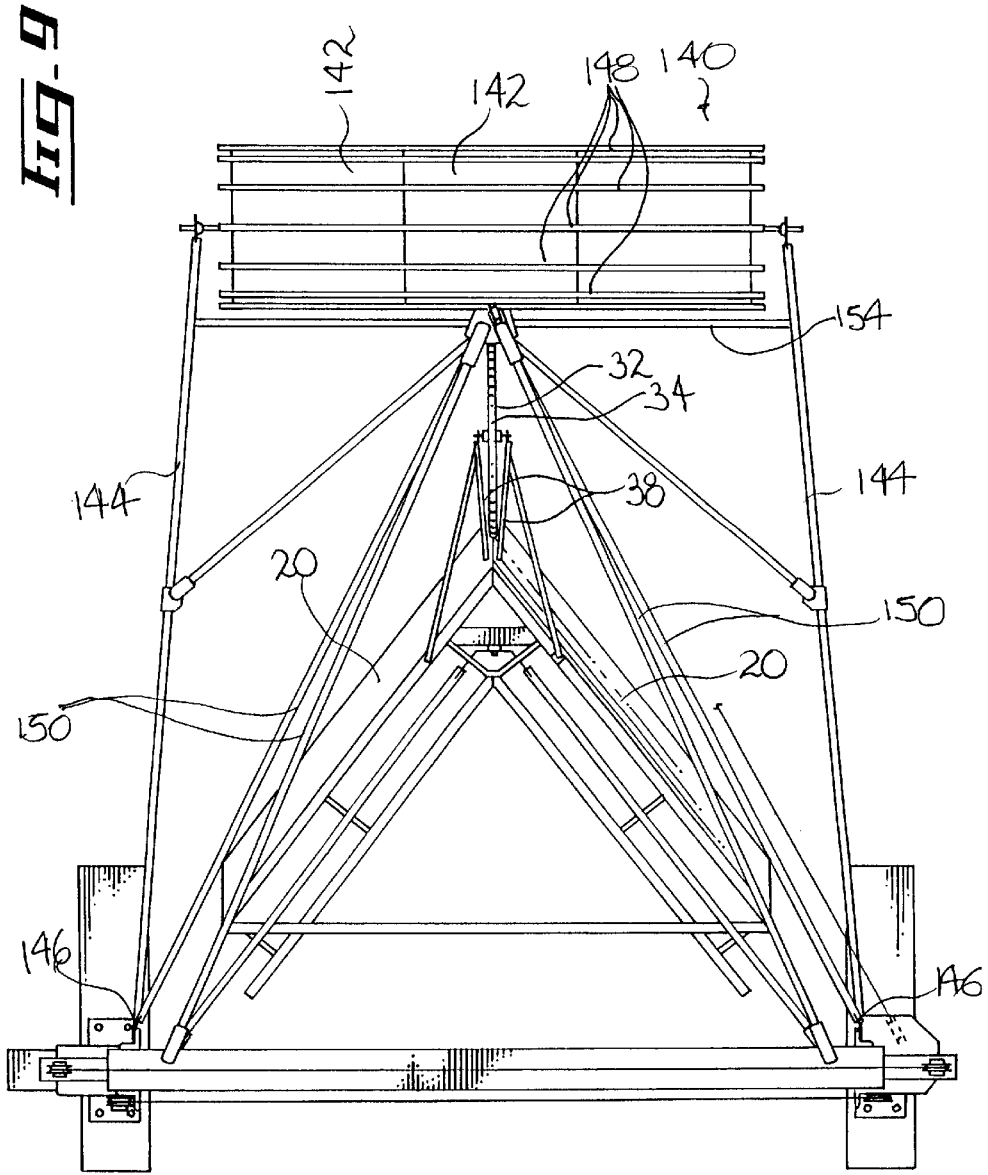

SNOW REMOVING DEVICE

FIELD OF THE INVENTION

The present invention relates to the general field of vehicle maintenance accessories and is particularly concerned with a device for removing snow accumulation from a vehicle's roof.

BACKGROUND OF THE INVENTION

The roof tops of semi-trailers, vans, trucks and the like represent a relatively large area. In cold climates, owners of such vehicles face the chore of removing snow and ice from the roof tops of such vehicles. The snow and ice removal operation is typically performed manually by several workers shoveling from atop the roof tops.

The operation is both tedious and time consuming. It is associated with relatively high maintenance cost especially when significant snowfalls occurs during a given period and when a large fleet of vehicles must be cleaned. Furthermore, since the cleaning operation can prove to be lengthy, it may even lead to delays in the delivery of goods with the associated potential loss of business.

The removal of snow and ice from the roof tops of vehicles is not only costly but also potentially unergonomical and even dangerous for the individuals who must stand on the slippery roof tops of such vehicles which can reach a height of several meters. The workers performing the shoveling operations are prone to developing lumbar injuries from the constant lifting and twisting motion and are also at great risks of falling from relatively high height with consequent potentially dangerous and even lethal injuries.

Although the shoveling of snow and ice from relatively large vehicle's roof tops presents major drawbacks, it is nevertheless performed by most truck owners and drivers since the failure to do so may potentially result in disastrous situations.

Indeed, in circumstances where the snow and/or ice is not removed from the roof tops of such vehicles, a slab of snow or ice may eventually fly off the vehicle and strike another vehicle following behind. If such an incident occurs, the driver of the vehicle following may be startled to the point of performing a maneuver causing loss of control of its vehicle. The slab of ice or snow may also potentially impact a windshield with such force so as to break the latter leading to disastrous consequences. Consequently, some regional bylaws recognize that snow and ice atop vehicles pose a threat to the public safety and require that snow and ice be removed from the vehicle before the latter is driven on a public road imposing stiff penalties to offenders.

It is also known that snow and ice remaining on a vehicle's roof top may potentially significantly alter the aerodynamical characteristics of the vehicle thus leading to increased fuel consumption and, again, therefore to increased cost of operation.

The need for alternative methods of removing snow and ice from vehicle's roof tops has been recognized in the prior art. For example, some devices include a bridge-like structure made of two vertical beams having an upper cross piece extending thereacross. The bridge-like structure supports a vertically adjustable snow plow assembly which rolls on wheels riding on the vertical beam. A wedge shaped plow forms the lower edge of the snow plowing assembly so that when a snow or ice covered truck or trailer moves under the properly positioned plow, the snow or ice is pushed off the top of the vehicle. Typically, the adjustment of the snow plow height is powered by winch on the cross beam which reels in or releases a chain from which the snow plow is hung.

Although this type of device presents an improvement of the conventionally used method of manually shoveling from atop the vehicles, it still presents major drawbacks.

For example, these prior art structure are ill suited for removing snow and ice from modern truck roof tops which often present a complex and varying relief. Indeed, the snow plow assembly being suspended from a chain may potentially be damaged or itself damage the roof top of the vehicle when the latter is driven thereunder. Certainly, the suspended snow plow assembly is not adapted to follow the general contour of the often aerodynamically shaped roof tops.

Furthermore, such devices are not adapted to take into consideration relatively small structures such as exhaust pipes, reinforcement ribs and the like which often protrude from the roof tops of modern vehicles and are subject to being sheared by the snow plow assembly of the prior art structures.

Furthermore, most prior art structures are not adapted to be adjusted for the varying textures and consistency of the snow and ice mixture lying on the vehicle's roof top. Indeed, prior art structures lack a means for adjusting pressure exerted by the plow assembly on the roof top depending on the type of vertical pressure required for plowing the snow and ice mixture.

The prior art structures also lack a means for breaking slabs of hardened snow or ice into smaller fragments prior to having the snow plow blade scrape the fragments off the vehicle's roof top. Conventional prior art structure may thus prove to be useless in situations wherein slabs of ice strongly adhered to the roof top of the vehicle.

Accordingly, there exists a need for an improved device for removing snow and ice from the roof top of vehicles which circumvent the hereinabove mentioned disadvantages associated with prior art structures.

Advantages of the present invention include that the proposed structure is particularly well suited for use in removing ice and now from the roof top of vehicles such semi-trailers, vans, trucks and the like.

The proposed device is adapted to allow for removal of snow and ice from the roof top of vehicles without undue risks to the operator of the device. Also, the proposed device offers the solution having built-in features for reducing the risk of damaging either the snow removing device or the vehicle while the latter is being cleaned.

More particularly, the proposed device has a built-in means for allowing automatic height adjustment of the scraping blades so that the lower edge thereof is maintained at predetermined spacing distance relative to the roof top.

The proposed device is also provided with a built-in features for allowing the removal of snow and ice between the scraping blade lower peripheral edge and the vehicle's roof top.

Furthermore, the proposed device has a built-in means for allowing customization of the weight of the snow plow assembly depending on the nature and consistency of the snow and ice mixture being cleaned.

Still further, the proposed device has a built-in means for initiating an ice breaking action by creating localized pressure areas on the surface of the ice being removed.

More particularly, the proposed device has a breaking assembly for breaking slabs of ice prior to having the scraping assembly scrape the fragmented slabs off from the roof top of the vehicle.

Also, the proposed device is specifically designed so as to be manufacturable using conventional forms of manufacturing so as to provide a snow removing device that will be economically feasible, long lasting and relatively trouble free in operation.

SUMMARY OF THE INVENTION

In accordance with an embodiment of the invention, there is provided a device for removing snow accumulation from a vehicle roof, the vehicle roof being part of a vehicle, the vehicle being supported on a ground surface, the device comprising: a scraping assembly for scrapping the snow accumulation from the vehicle roof, the scrapping assembly including a scrapping blade, the scrapping blade defining a blade lower peripheral edge; a supporting assembly linked to the scrapping assembly for adjustably supporting the scrapping assembly at a distance relative to the ground surface such that the vehicle roof can be positioned underneath the scrapping blade; the supporting assembly including a blade height adjustment means for automatically adjusting the position of the scrapping blade relative to the vehicle roof so as to maintain a predetermined blade spacing between the blade lower peripheral edge and the vehicle roof when the scrapping assembly scrapes the vehicle roof.

Preferably, the blade height adjustment means is attached to the scrapping assembly and positioned such that when the vehicle is moved relative to the scrapping blade in a predetermined vehicle direction the position adjustment means precedes the scrapping blade along the vehicle roof, the blade height adjustment means adjusting the spacing between the blade lower peripheral edge and a predetermined section of the vehicle roof before the scrapping blade reaches the predetermined section of the vehicle roof; whereby when the vehicle approaches the device, the blade height adjustment means contacts the vehicle roof before the scrapping blade and, once the scrapping blade begins scrapping the vehicle roof, the blade height adjustment means allows the blade lower peripheral edge to follow the contour of the vehicle roof while maintaining the predetermined blade spacing relative to the vehicle roof.

Conveniently, the blade height adjustment means includes a height adjustment wheel defining a wheel circumferential surface; the height adjustment wheel being rollably attached to the scrapping blade so as to extend from the scrapping blade in a direction opposite the predetermined vehicle direction; the height adjustment wheel being sized and positioned so that when the wheel circumferential surface contacts the vehicle roof, the height adjustment wheel lifts the scrapping blade away from the vehicle roof so as to maintain the predetermined blade spacing between the blade lower peripheral edge and the vehicle roof.

Preferably, the blade height adjustment means includes a skate component extending from the blade lower peripheral edge, the skate component defining a gliding surface for gliding on the vehicle roof, the skate component being configured and sized so as to maintain the predetermined blade spacing between the blade lower peripheral edge and the vehicle roof as the gliding surface glides on the vehicle roof.

Conveniently, the device further comprises a blade pressure adjustment means for adjusting the amount of pressure exerted by the scrapping assembly on the vehicle roof. Preferably, the blade pressure adjustment means includes a blade counterweight system.

Conveniently, the blade counterweight system includes a blade adjustable weight attached to a first end of a blade counterweight cable, the second end of the blade counterweight cable being attached to the blade assembly, the blade counterweight system also including a blade pulley system for orienting the blade counterweight cable so that the tension created in the blade counterweight cable by the adjustable weight pulls the scrapping assembly upwardly so as to reduce the amount of pressure exerted by the scrapping assembly on the vehicle roof.

Preferably, the scrapping assembly further includes a substantially resilient skirt extending from the scrapping blade so as to fill the predetermined blade spacing and so as to contact the vehicle roof when the scrapping assembly scrapes the vehicle roof. Conveniently, the device further comprises a breaking assembly for breaking slabs of hardened snow and ice supported on the vehicle roof, the breaking assembly being attached to the supporting assembly.

Preferably, the breaking assembly is positioned so that when the vehicle is moved relative to the scrapping blade in the predetermined vehicle direction the breaking assembly precedes the scrapping blade along the vehicle roof.

Conveniently, the breaking assembly is provided with a breaking assembly height adjustment means for adjusting the height of the breaking assembly whereby the a breaking assembly height adjustment means allows the breaking assembly to be selectively put into contact with the vehicle roof and to selectively follow the contour of the vehicle roof.

Preferably, the device further comprises a breaking assembly pressure adjustment means for adjusting the amount of pressure exerted by the breaking assembly on the vehicle roof. Conveniently, the braking assembly pressure adjustment means includes a braking assembly counterweight system. Preferably, the breaking assembly includes a breaking roller rotatably attached to the supporting assembly, the breaking roller defining a generally radially extending braking blade.

Conveniently, the device further comprises an breaking assembly for breaking slabs of hardened snow and ice supported on the vehicle roof, the breaking assembly including a breaking roller rotatably attached to a breaking roller arm, the breaking roller arm being pivotally attached to the supporting assembly, the breaking roller defining a set of generally radially extending braking blades; the breaking assembly being provided with a breaking assembly height adjustment means for adjusting the height of the breaking assembly; the breaking assembly being also provided with a breaking assembly pressure adjustment means for adjusting the amount of pressure exerted by the breaking assembly on the vehicle roof, the braking assembly pressure adjustment means including a braking assembly counterweight system.

Preferably, the device further comprises a manual overriding means for allowing manual overriding of the automatic height adjustment provided by the blade height adjustment means.

Conveniently, the supporting assembly includes a supporting frame, the supporting frame including a pair of generally vertically oriented frame posts, the frame posts being anchored to the ground surface and horizontally spaced relative to each other so as to allow through passage of the vehicle therebetween; a blade carriage attached to the scrapping assembly, the blade carriage being slidably mounted between the frame posts; a carriage guiding means positioned between the frame posts and the blade carriage for guiding the vertical movement of the blade carriage along the frame posts while reducing the friction between the blade carriage and the frame posts.

In accordance with the present invention, there is also provided a device for removing snow accumulation from a vehicle roof, the vehicle roof being part of a vehicle, the vehicle being supported on a ground surface, the device comprising: a scraping assembly for scrapping the snow accumulation from the vehicle roof, the scrapping assembly including a scrapping blade, the scrapping blade defining a blade lower peripheral edge; a supporting assembly linked to the scrapping assembly for adjustably supporting the scrapping assembly at a distance relative to the ground surface such that the vehicle roof can be positioned underneath the scrapping blade; an breaking assembly for breaking slabs of hardened snow and ice supported on the vehicle roof, the breaking assembly being attached to the supporting assembly.

Conveniently, the breaking assembly is positioned so that when the vehicle is moved relative to the scrapping blade in the predetermined vehicle direction the breaking assembly precedes the scrapping blade along the vehicle roof. Preferably, the breaking assembly is provided with a breaking assembly height adjustment means for adjusting the height of the breaking assembly whereby the a breaking assembly height adjustment means allows the breaking assembly to be selectively put into contact with the vehicle roof and to selectively follow the contour of the vehicle roof.

BRIEF DESCRIPTION OF THE DRAWINGS

An embodiment of the present invention will now be disclosed, by way of example, in reference to the following drawings, in which:

FIG. 6 in a partial front perspective view with sections taken out, illustrates a pulley spacing arm, part of the supporting assembly associated with the snow removing device, in accordance with the present invention;

FIG. 7 in a partial side elevational view, illustrates a scraping blade, part of the snow removing device in accordance with the present invention, arriving on the roof of a vehicle, the scraping blade being shown with a skate component and a height adjustment wheel attached thereto;

FIG. 8 in a partial side elevational view with sections taken out, illustrates the initial contact between the height adjustment wheel and the front end of a conventional semi-trailer truck, the height adjustment wheel being shown lifting the scraping blade as the vehicle moves towards the scraping blade;

FIG. 9 in a top view, illustrates the snow removing device in accordance with a second embodiment of the present invention;

DETAILED DESCRIPTION

Figure 1:
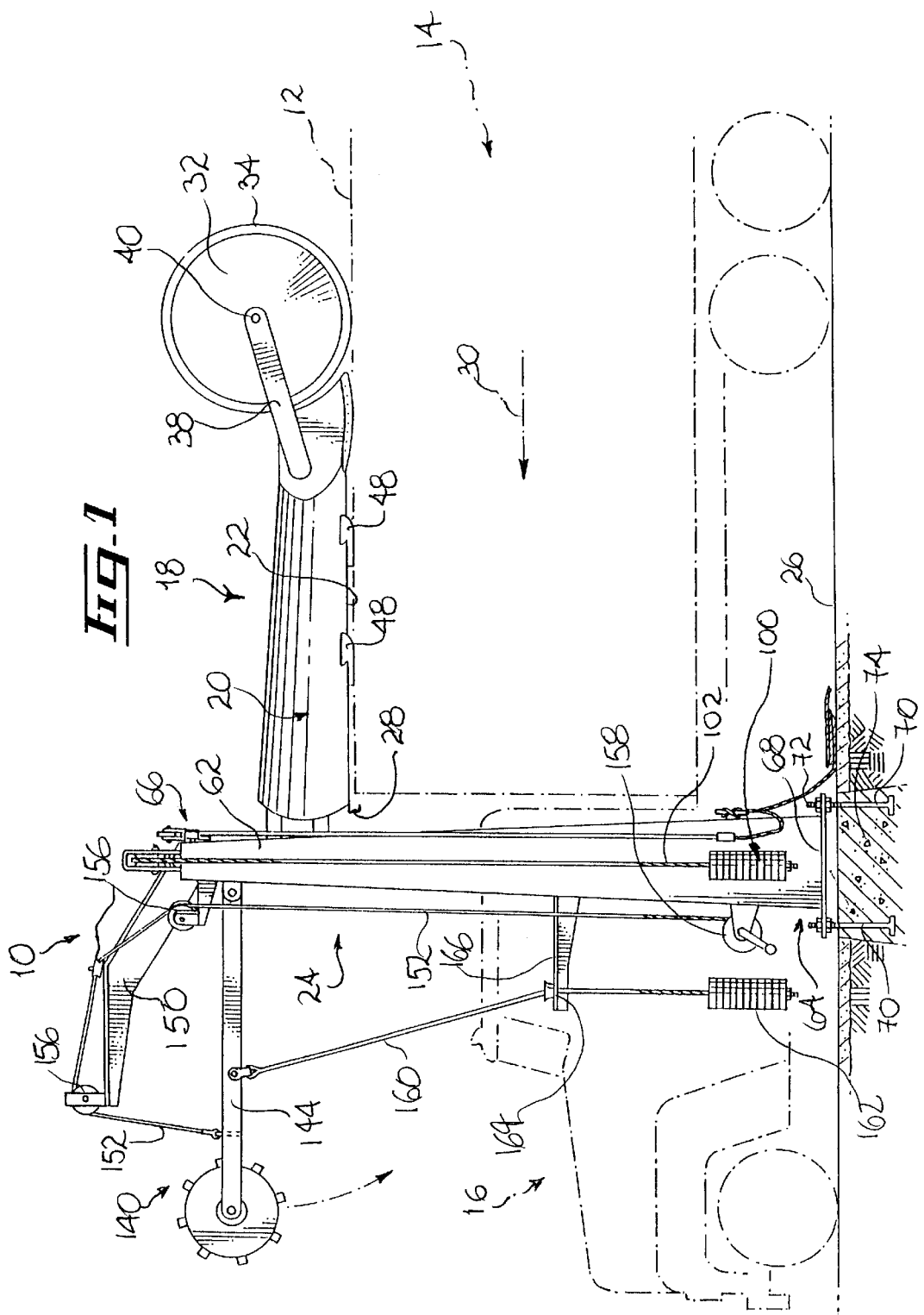
FIG. 1 in a side elevational view with sections taken out, illustrates a snow removing device in accordance with first embodiment of the present invention, the snow removing device being shown removing snow from the roof of a semi-trailer, part of a semi-trailer truck, the semi-trailer truck being shown with sections taken out and in phantom lines.

Referring to FIG. 1, there is shown in a side elevational view with sections taken out a snow removing device (10) in accordance with an embodiment of the present invention.

The snow removing device (10) is shown being used to remove a mixture of ice and snow from the roof top (12) of a conventional semi-trailer (14) attached to a conventional truck cabin (16). It should be understood that although FIGS. 1, 2, 7 and 8 illustrate the device (10) as being used on the roof of a conventional semi-trailer, the device (10) could be used on the roof of any other suitable vehicle without departing from the scope of the present invention.

The snow removing device (10) includes a scraping assembly (18) for scraping an accumulation of snow on the vehicle's roof (12). The scraping assembly, in turn, includes a scraping blade (20) defining a blade lower peripheral edge (22).

The device (10) also includes a supporting assembly (24) linked to the scraping assembly (18) for adjustably supporting the scraping assembly (18) at a distance relative to the ground surface (26), supporting both the device (10) and the vehicle.

The supporting assembly (24) typically supports the scraping assembly (18) at a distance relative to the ground surface (26) such that the vehicle roof (12) can be positioned underneath the scraping blade (20).

The supporting assembly (24) includes a blade height adjustment means for automatically adjusting the position of the scraping blade (20) relative to the vehicle's roof (12) so as to maintain a predetermined blade spacing (28) between the blade lower peripheral edge (22) and the vehicle's roof (12) when the scraping assembly (18) scrapes the vehicle's roof (12).

Preferably, the blade height adjustment means is attached to the scraping assembly (18) and positioned such that when the vehicle is moved relative to the scraping blade (20) in a predetermined vehicle direction, the position adjustment means precedes the scraping blade (20) along the vehicle's roof (12).

In FIG. 1, the predetermined vehicle direction is generally indicated by arrow (30). The blade height adjustment means thus adjusts the spacing (28) between the blade lower peripheral edge (22) and a predetermined section of the vehicle's rood (12) before the scraping blade (20) reaches the predetermined section of the vehicle's roof.

Preferably, the blade height adjustment means includes a height adjustment wheel (32) defining a wheel circumferential surface (34). The height adjustment wheel (32) is typically rollably attached to the scraping blade (20) so as to extend from the scraping blade (20) in a direction opposite the predetermined vehicle direction (30).

Figure 2:
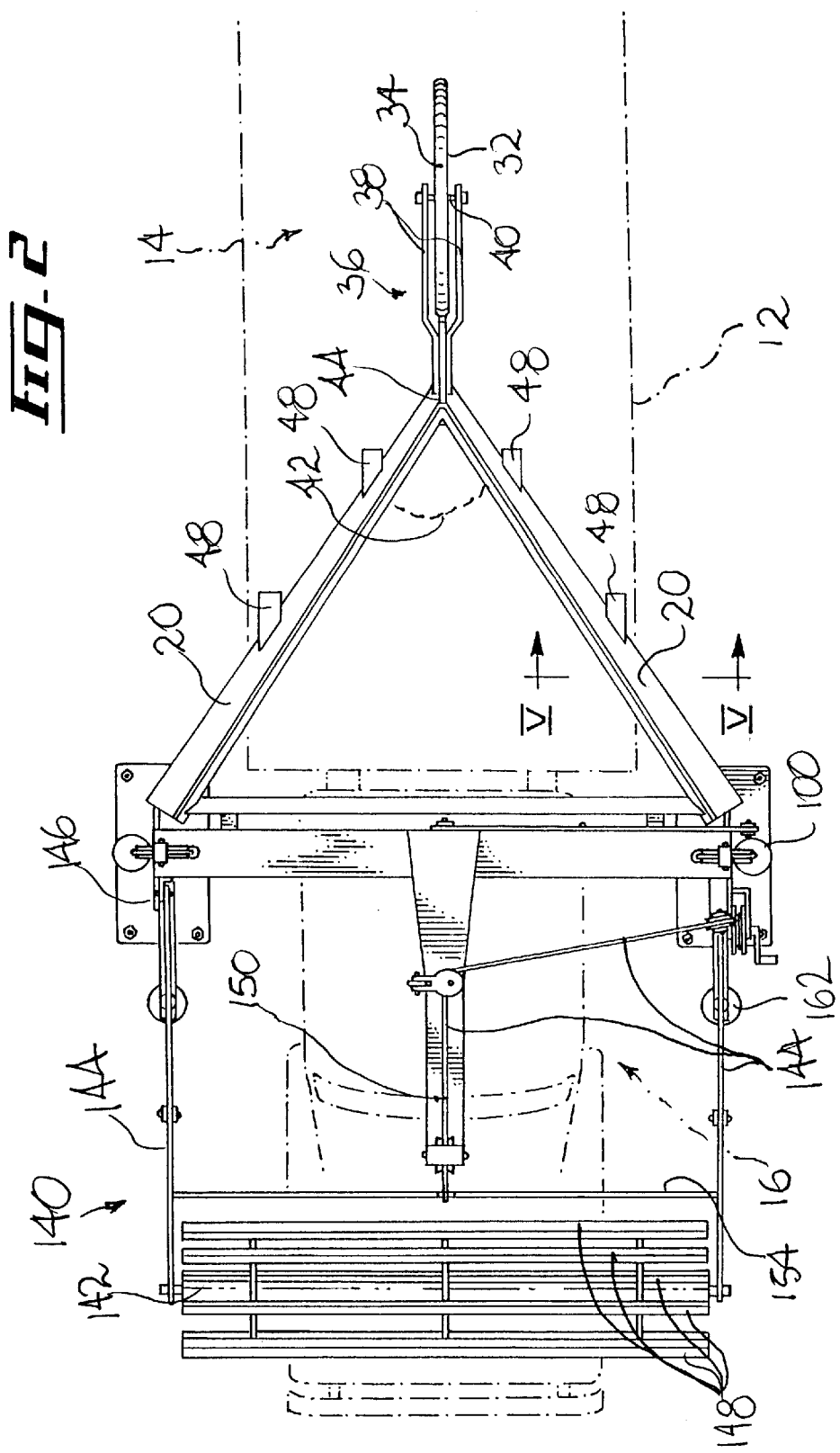
FIG. 2 in a top view, illustrates the snow removing device and semi-trailer truck shown in FIG. 1.

Typically, although by no means exclusively, as shown more specifically in FIG. 2, the height adjustment wheel (32) is attached to the blade (20) by a forked yoke (36) defining a pair of yoke tines (38) extending from the blade (20). The height adjustment wheel (32) is mounted on a wheel axle (40) mounted between the tines (38). The height adjustment wheel (32) is sized and positioned so that when the wheel circumferential surface (34) contacts the vehicle's roof (12), the height adjustment wheel (32) lifts the scraping blade (20) away from the vehicle's roof (12) so as to maintain the predetermined blade spacing (28) between the blade lower peripheral edge (22) and the vehicle's rood (12).

As shown more specifically in FIG. 2, the scraping blade (20) preferably includes a pair of blade sections that are angled relative to each other about an internal blade angle (42) and merging together about a blade apex section (44) so as to define a generally "V" or wedge shaped scraping blade (20). Typically, although by no means exclusively, the blade internal angle has a value substantially in the range of 60°.

Figure 5:
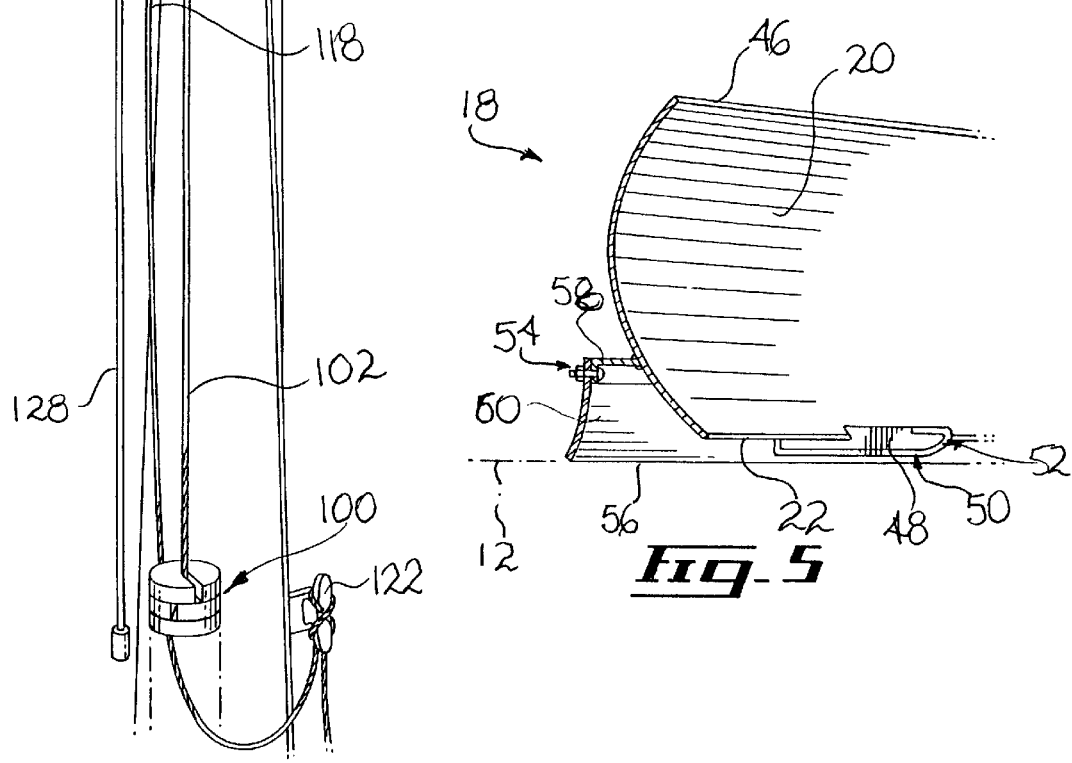
FIG. 5 in a partial front perspective view, illustrates part of a scraping blade having a skate component and a skirt attached thereto.
Figure 10:
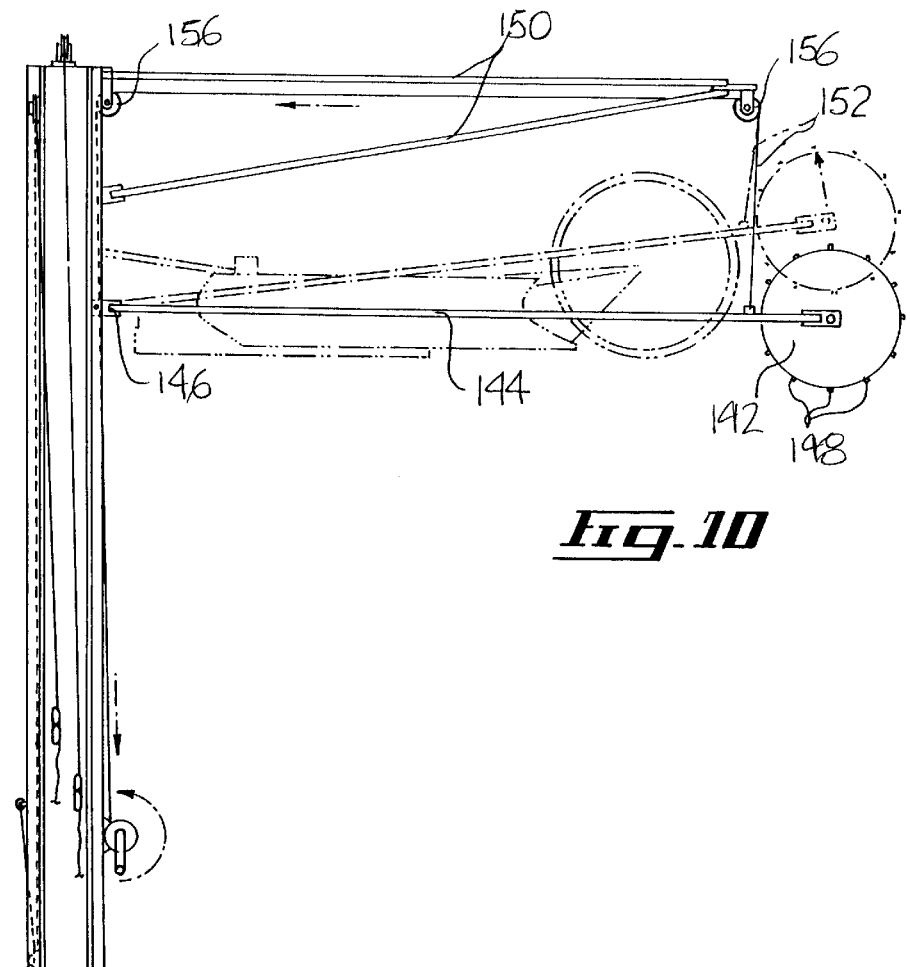
FIG. 10 in a partial side elevational view with sections taken out, illustrates a snow removing device in accordance with a second embodiment of the present invention. The snow removing device being shown with its ice breaking assembly pivoting between a lowered and a raised configuration. The ice breaking assembly in its raised configuration and the scraping assembly both being shown in phantom lines.

Referring now more specifically to FIG. 5, there is shown that the scraping blade (20) preferably has a generally C-shaped cross sectional configuration defining not only a blade lower peripheral edge (22) but also a blade upper peripheral edge (46).

The blade height adjustment means preferably also includes at least one and preferably a set of skate components (48) attached to the blade lower peripheral edge (22). The skate components (48) are preferably spaced along both sections of the scraping blade (20) as illustrated in FIG. 2.

Referring back to FIG. 5, there is shown that each skate component (48) defines a corresponding skate gliding surface (50) for gliding on the vehicle's roof (12). The skate gliding surface (50) may optionally be coated with a friction reducing coating made out of polytetrafluoroethylene or other suitable material. Each skate component (48) is configured and sized so as to maintain the predetermined blade spacing (28) between the blade lower peripheral edge (22) and the vehicle's roof (12) when the gliding surface (50) glides on the vehicle's roof (12). Each skate component (48) is preferably further provided with an upwardly curved skate front surface (52) for allowing the skate components (48) to smoothly ride over protuberances or other relief that may protrude from the vehicle's roof (12).

As shown in FIG. 5, the scraping assembly (18) preferably further includes a substantially resilient skirt (60) extending from the scraping blade (20) so as to fill the predetermined blade spacing (28) and so as to contact the vehicle's roof (12) when the scraping assembly (18) scrapes the vehicle's roof (12). Preferably, although by no means exclusively, the resilient skirt (60) is releasably attached to the scraping blade (20) using a generally L-shaped skirt mounting bracket (58) extending from a rear surface of the scraping blade (20). The resilient skirt (60) is preferably releasably attached to the skirt mounting bracket (58) using a conventional detachable attachment means such as a combination nuts and bolt arrangement (54). The releasable attachment of the resilient skirt to the scraping blade (20) allows the resilient skirt (60) to be easily replaced when needed such as when the resilient skirt is worn out, damaged or the like.

The resilient skirt (60) is preferably made out of a substantially resilient material such as a strip of elastomeric resin adapted to resiliently deform upon impact with relatively solid obstacles such as component of the vehicle's roof (12) protruding from the latter and to remain substantially undeformed when sweeping ice or snow from the vehicle's roof top (12). Typically, the resilient skirt (60) defines a skirt lower peripheral edge (56) positioned substantially in register or immediately below the lower gliding surface (50) of the skate components (48).

The supporting assembly (24) includes a supporting frame for adjustably supporting the scraping assembly (18). The supporting frame preferably includes a pair of generally vertically oriented frame posts (62). The frame posts (62) are anchored to the ground surface (26) and horizontally spaced relative to each other so as to allow through passage of a vehicle therebetween.

Each frame post (62) defines a corresponding post lower peripheral edge (64) and a post upper peripheral edge (66). A base plate (68) is preferably solidly attached to the each post lower peripheral edge (64).

Each base plate (68) is provided with bolt receiving apertures extending therethrough for receiving corresponding anchoring bolts (70). The anchoring bolts (70) are preferably provided with a threaded bolt section (72) protruding from the ground surface (26) and allowing for fine tuning of the vertical leveling of the frame posts (62). The base section of each anchoring bolt (70) is preferably solidly embedded within a slab or block of solid material such as a block of concrete (74) anchored into the ground surface (26).

Preferably, a generally horizontally oriented cross post (76) is solidly attached to the upper end section (66) of each vertical frame post (62) so as to extend thereacross. A combination of the vertical frame post (62) and of the horizontal cross post (76) thus defines an overhead ridge structure which is configured and sized for allowing through passage of a conventional vehicle such as a truck, a van, a semi-trailer or the like thereunderneath. The cross post (76) not only solidifies the supporting frame but also allows for mounting of various components thereunto as will be disclosed hereinafter.

Figure 3:
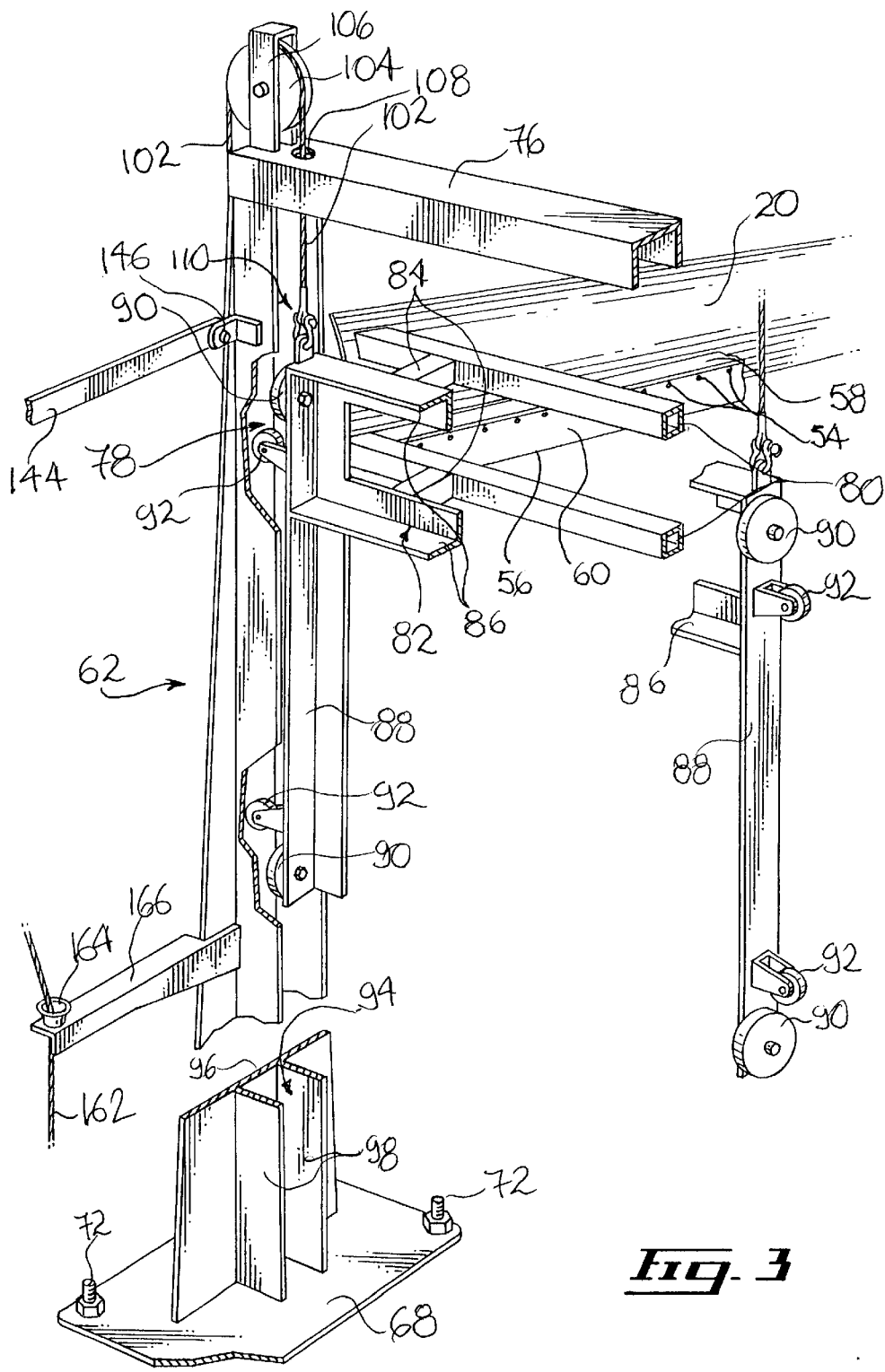
FIG. 3 in a rear perspective view with sections taken out, illustrates part of a supporting assembly and of a blade carriage, both part of the snow removing device shown in FIGS. 1 and 2, the frame posts, part of the supporting assembly, being shown with their guiding channel having cut-out sections.
Figure 4:
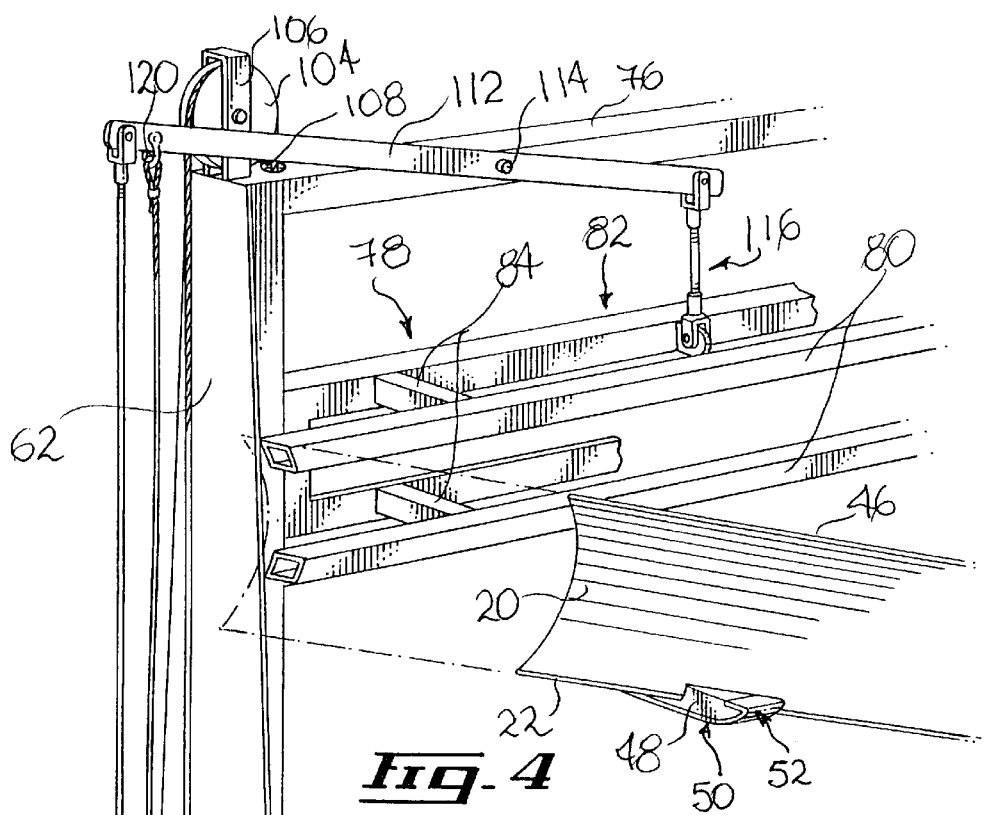
FIG. 4 in a partial front perspective view with sections taken out, illustrates part of the supporting assembly, the scraping blade and associated blade carriage, part of the snow removing device shown in FIGS. 1 through 4.
Figure 11:
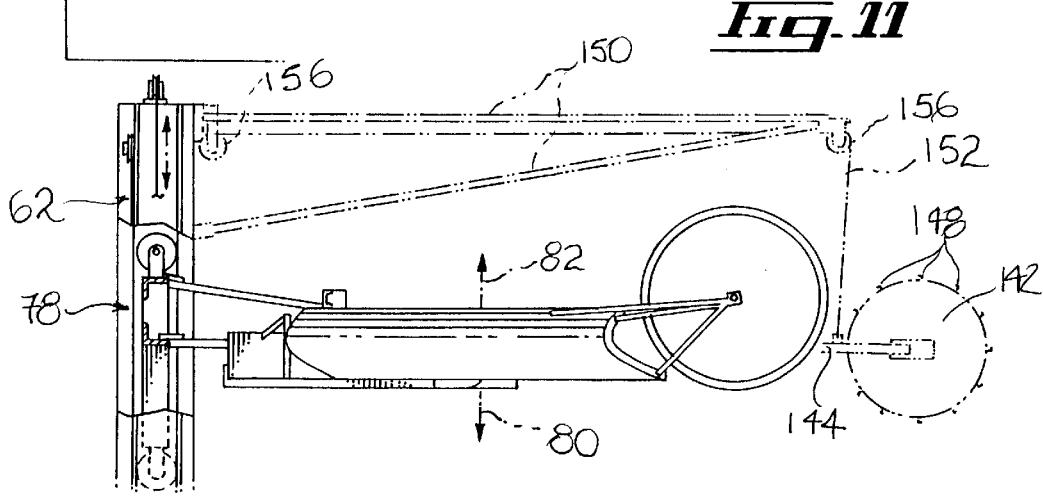
FIG. 11 in a partial side elevational view with sections taken out, illustrates part of a snow removing device in accordance with a second embodiment of the present invention. The snow removing device being shown with its ice breaking assembly in its lowered configuration and in phantom lines.

The scraping blade (20) is preferably attached to a blade carriage (78) shown in greater details in FIGS. 3, 4 and 11. As shown in FIG. 11, the blade carriage (78) is slidably mounted between the frame post (62) so as to allow vertical movement of the blade carriage (78) towards and away from the ground surface (26) as indicated respectively by arrows (80) and (82).

A carriage guiding means is preferably further provided between the frame post (62) and the blade carriage (78) for guiding the vertical movement of the blade carriage (78) along the frame post (62) while reducing the friction between the blade carriage (78) and the frame post (62). As shown more specifically in FIGS. 3 and 4, the blade carriage (78) preferably includes a pair of blade attachment posts (80) solidly attached at longitudinal ends thereof to the inner surface of the blade sections (20). The blade attachment posts (80) are, in turn, solidly attached to a sliding frame (82) by post-to-frame linking rods (84). The sliding frame (82) typically includes sliding frame longitudinal beam segments (86) attached at each longitudinal end thereof to a frame stabilizing bracket (88).

Both the sliding frame longitudinal segments (86) and the frame sliding brackets (88) typically, although by no means exclusively, have a generally L-shaped cross sectional configuration. A set of frame guiding wheels (90), (92) are rotatably attached to the frame sliding bracket (88) so as to rotate about generally perpendicular rotating axis relative to each other.

Each frame post (62) typically defines a generally U-shaped and internally oriented guiding channel (94) for slidably receiving a corresponding frame sliding bracket (88). Each channel (94) typically includes a channel base wall (96) and a pair of generally perpendicular channel side walls (98) extending therefrom. The guiding wheels (90), (92) are adapted to rollably contact respectively the channel side walls (98) and a channel base wall (96) for guiding the vertical movement of the frame sliding bracket (88). The guiding rollers (90), (92) are preferably provided with suitable ball-bearing arrangements so as to reduce friction and provide a smooth movement of the frame sliding brackets (88) within the guiding channels (94).

The snow removing device (10) preferably further includes a blade pressure adjustment means for adjusting the amount of pressure exerted by the scraping assembly (18) on the vehicle's roof (12). Preferably, the blade pressure adjustment means includes a blade counterweight system. The blade counter weight system typically includes a blade adjustable weight (100) attached to a first end of the blade counterweight cable (102). The second end of the blade counterweight cable (102) is attached to the blade assembly (18). The blade counterweight system also includes a blade pulley system for orienting the blade counterweight cable (102) so that the tension created in the blade counterweight cable (102) by the blade adjustable weight (100) pulls the scraping assembly (18) upwardly so as to reduce the amount of pressure exerted by the scraping assembly (18) on the vehicle's roof (12).

In the first embodiment of the invention, illustrated in FIGS. 1 through 4, a blade counterweight cable (102) is redirected by a blade counterweight pulley (104) mounted over each frame post (62).

Each blade counterweight pulley (104) is rotatably mounted to a counterweight pulley bracket (106) extending upwardly from the cross bar (76) adjacent each frame post (62).

Each blade counterweight cable (102) extends upwardly towards a corresponding blade counterweight pulley (104) and is redirected downwardly by the latter through a counterweight cable aperture (108) formed in a cross bar (76).

Each blade counterweight cable (102) is then attached to a longitudinal end of the sliding frame (82) using a suitable counterweight cable attachment clip (110).

Figure 12:
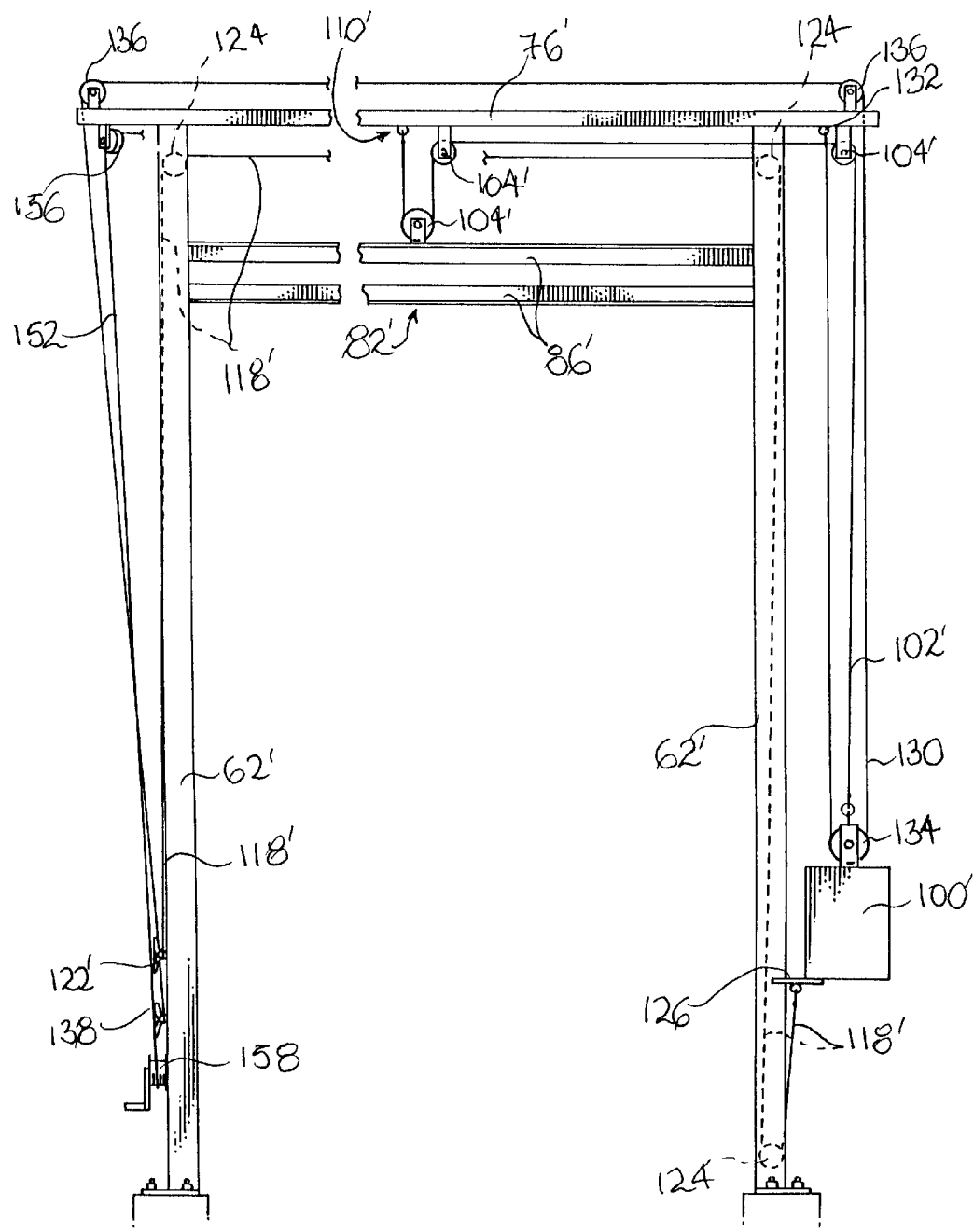
FIG. 12 in a partial front view with sections taken out, illustrates some of the pulley arrangements, part of the snow removing device, in accordance with a second embodiment of the present invention.

In the second embodiment of the invention, illustrated in FIGS. 9 through 12, the blade adjustable weight (100') is attached through the blade counterweight cable (102') to a central section of the sliding frame (82) as shown more specifically in FIG. 12.

The blade counterweight cable (102) is redirected by a pair of blade counterweight pulleys (104') attached to a lower surface of the cross bar (76) and another blade counterweight pulley (104') attached to an upper surface of the sliding frame (82) adjacent a central section thereof. The blade counterweight cable (102) is then attached to the undersurface of the cross bar (76) using a cable attachment clip (110').

The snow removing device (10) is preferably further provided with a lower threshold setting means for setting the lower threshold of the vertical movement of the blade assembly (18). In the first embodiment of the invention shown in FIGS. 1 through 4, the lower threshold setting means includes a blade lever arm (112) pivotally attached by a lever arm pin (114) to the cross bar (76).

A first longitudinal end of the blade lever arm (112) is pivotally attached to the sliding frame (82) by a lever arm-to-sliding frame attachment assembly (116). A threshold setting cable (118) is attached to the deposed longitudinal end of the blade lever arm (112) by a lever arm-to-threshold setting cable attachment hook (120) the other end of the threshold setting cable (118) is adapted to be releasably attached to a threshold cable attachment anchor (122) preferably protruding from one of the frame posts (62). The length of the threshold setting cable (118) will determine the lower threshold that can be reached by the scraping assembly (18).

In the second embodiment of the invention, shown in FIGS. 9 through 12, the threshold setting cable (118') also has a longitudinal end thereof attached to a threshold cable anchoring structure (122') protruding from one of the vertical frame posts (62').

However, the threshold setting cable (118') is redirected through a set of threshold cable pulleys (124) attached to the supporting frame so that the opposed longitudinal end of the threshold setting cable (118') may be attached to a threshold setting cable-to-blade counterweight connector (126) extending from the blade adjustable weight (100').

The length of the threshold setting cable (118') will determine the distance that the blade adjustable weight (100') is able to travel upwardly and, thus, will again determine the lower threshold at which the blade assembly (18) may be lowered.

Hence, for both the first and second embodiments of the invention, a supporting assembly (24) adjustably supports the scraping assembly (18) defining a lower threshold at which the blade assembly (18) may be lowered while allowing the blade assembly (18) to be raised from the lower threshold to suitable heights depending on the specific contour of the vehicle's top surface (12).

The snow removing device (10) is preferably further provided with a manual means for allowing manual overriding of the automatic height adjustment provided by the blade height adjustment means.

In the first embodiment of the invention shown in FIGS. 1 through 4, the manual overriding means includes an elongated handle (128) attached to the blade lever arm (112) adjacent the threshold cable-to-lever arm attachment clip (120). The handle (128) extends downwardly so that it may grasped by an intended user and used for lifting the blade assembly (18) through pivoting movement of the blade lever arm (112). The handle (128) may also optionally be raised and lowered sequentially in situations, e.g., in which the blade assembly (18) needs to be impacted on the vehicle's roof (12) for breaking hardened snow or ice.

In the second embodiment of the invention, illustrated in FIGS. 9 through 12, the manual overriding means includes an overriding cable (130) attached at a first longitudinal end thereof to an undersurface of the cross bar (76') by an overriding cable attachment clip (132).

The overriding cable (130) is attached to the blade adjustable weight (100') and redirected by an overriding main pulley (134) mounted on the blade adjustable weight (100'). The overriding cable (130) is then redirected by a set of overriding auxiliary pulleys (136) attached to the supporting frame so that a second longitudinal end of the overriding cable (130) may be releasably attached to an overriding cable anchoring component (138) protruding from one of the frame posts (62').

The overriding cable (138) thus limits the downward movement of the blade adjustable weight (100') and, hence, the upward movement of the scraping assembly (118). By sequentially pulling on the threshold setting cable (118') and the overriding cable (130), an intended individual may override the automatic height adjustment provided by the blade height adjustment means.

Furthermore, sequential pulling of the cables (118') and (130) allows for sequential up and down movement of the scraping assembly (18), e.g., in situations wherein the scraping assembly (18) is used for crushing hardened snow or ice.

Still further, the overriding cable (130) allows the scraping assembly (18) to be set at a predetermined height for situations wherein it is desirable not to allow the scraping assembly (18) to be automatically raised by the contour of the vehicle's top surface (12).

The snow removing device (10) preferably further includes an ice breaking assembly (140) for breaking slabs of hardened snow and ice supported on the vehicle's roof (12). The ice breaking assembly (140) is typically attached to the supporting assembly (24).

In the preferred embodiment of the invention shown in FIGS. 9 through 12, the breaking assembly (140) is positioned so that when the vehicle is moved relative towards the scraping blade (20), the ice breaking assembly (140) precedes the scraping blade (20) along the vehicle's roof (12).

In an alternative embodiment of the invention shown in FIGS. 1 through 4, the breaking assembly (140) is positioned so that the ice breaking assembly (140) follows the scraping blade (20) along the vehicle's roof (12).

In a preferred embodiment of the invention, the breaking assembly includes a breaking roller (142) rotatably attached to a braking roller arm at both longitudinal ends thereof to corresponding breaking roller arms (144).

The breaking roller supporting arms (144) are, in turn, pivotally attached to the supporting assembly. The breaking roller arms (144) are preferably pivotally attached by roller arm hinges (146) to a corresponding frame post (62).

The breaking roller (142) has a set of generally radially extending breaking blades (148) protruding radially therefrom.

The ice breaking assembly (140) is preferably provided with a breaking assembly height adjustment means for adjusting the height of the ice breaking assembly. The breaking assembly height adjustment means allows the breaking assembly (140) to be selectively put into contact with the vehicle's roof (12) and to selectively follow the contour of the latter.

The breaking assembly height adjustment means includes a breaking assembly spacing structure (150) extending from the supporting assembly (24). A breaking assembly lifting cable (152) is attached to the breaking roller arm (144), preferably adjacent a distal end thereof and, preferably, through a roller arm transversal rod (154) extending therebetween. A set of breaking assembly pulleys (156) mounted on the supporting assembly and on the spacing structure (150) are adapted to redirect the breaking assembly lifting cable (152) towards a winding drum (158) part of the winch mechanism for pivoting the breaking assembly between its lowered configuration shown in full lines in FIG. 10 and its raised configuration shown in phantom lines in FIG. 10.

The breaking assembly is preferably provided with a breaking assembly pressure adjustment means for adjusting the amount of pressure exerted by the breaking assembly (140) on the vehicle's roof (12). The breaking assembly pressure adjustment means typically includes a breaking assembly counterweight system. The breaking assembly counterweight system typically includes a breaking assembly counterweight cable (160) attached at a first longitudinal end thereof through the breaking roller arm (144) and having a breaking assembly adjustable weight (162) attached thereto adjacent its other longitudinal end. Preferably, the breaking assembly adjustable weight cable (160) is guided through a guiding channel (164) formed in a guiding arm (166) extending from a guide post (62).

In use, the lower threshold of the scraping assembly (18) and the angle of the breaking assembly (140) are first customized depending on the height and configuration of the vehicle to be cleaned. The blade pressure adjustment means and the breaking assembly pressure adjustment means are also preferably initially adjusted depending on the specific texture, consistency and thickness of the snow and/or ice formation on the vehicle's roof (12).

A relative movement is then created between the Snow removing device (10) and the vehicle to be cleaned. Typically, the vehicle approaches the snow removing device (10) in a vehicle direction indicated by arrow (30) in FIG. 1. In an alternative embodiment of the invention (not shown), the vehicle (10) may remain stationary while the snow removing device (10) is moved relative to the ground surface (26) towards the vehicle to be cleaned by a railing system (not shown) or the like.

During the snow removing operation, the blade height adjustment means automatically adjusts the position of the scraping blade relative to the vehicle's roof (12) so as to maintain the predetermined blade spacing between the blade lower peripheral edge (22) and the vehicle's roof (12). As shown more specifically in FIG. 8, when the vehicle approaches the device (10), the blade height adjustment means and, more particularly, the height adjustment wheel (32) contacts the vehicle's roof (12) before the scraping blade (20). The scraping blade (20) is thus lifted to a suitable height prior to contacting the vehicle so as to reduce the risk of having the scraping blade (20) damage the vehicle.

During the cleaning operation, the blade height adjustment means allows the blade lower peripheral edge (22) to follow the contour of the vehicle's roof while maintaining the predetermined blade spacing relative to the vehicle's roof, as shown in FIG. 7.

During most of the cleaning operation, both the height adjustment wheel (32) and the skate components (48) contact the vehicle's roof (12) and thus participate in the adjustment of the height of the cleaning blade (20). When the height adjustment wheel (32) reaches the rear peripheral edge of the vehicle's roof (12), the skate components (48) keep the gripping blade (20) in its spaced relationship relative to the vehicle's roof (12). The predetermined spacing between the blade or peripheral edge (22) and the vehicle's roof (12) is intended to prevent having the scraping blade (20) damage structures such as reinforcement ribs or the like that may protrude from the vehicle's roof (12).

In order to provide a thorough snow removal, any snow or ice left on the vehicle's roof (12) by the spacing (28) is swept by the resilient skirt (60). The resilient skirt (60) is adapted to sweep the vehicle's roof (12) while resiliently bending upon contact with relative rigid structures such as reinforcement ribs that may protrude from the vehicle's roof (12).

When needed, the breaking assembly (40) may be used for breaking relatively hard slabs of hardened snow or ice. In the configuration shown in FIGS. 9 through 12, the breaking assembly (40) precedes the scraping assembly (18) along the vehicle's roof (12) so that the broken slabs of ice and snow may be scraped from the vehicle's roof (12) by the scraping assembly (18).

The embodiments of the invention in which an exclusive privilege or property is claimed are defined as follows:

1. A device for removing snow accumulation from a vehicle roof, said vehicle roof being part of a vehicle, said vehicle being supported on a ground surface, said device comprising:
   a scraping assembly for scrapping said snow accumulation from said vehicle roof, said scrapping assembly including a scrapping blade, said scrapping blade defining a blade lower peripheral edge;
   a supporting assembly linked to said scrapping assembly for adjustably supporting said scrapping assembly at a distance relative to said ground surface such that said vehicle roof can be positioned underneath said scrapping blade;
   said supporting assembly including an automatic blade height adjustment means for automatically adjusting the position of said scrapping blade relative to said vehicle roof so as to maintain a predetermined blade spacing between said blade lower peripheral edge and said vehicle roof when said scrapping assembly scrapes said vehicle roof.

2. A device as recited in claim 1 wherein said blade height adjustment means is attached to said scrapping assembly and positioned such that when said vehicle is moved relative to said scrapping blade in a predetermined vehicle direction said blade height adjustment means precedes said scrapping blade along said vehicle roof, said blade height adjustment means adjusting the spacing between said blade lower peripheral edge and a predetermined section of said vehicle roof before said scrapping blade reaches said predetermined section of said vehicle roof; whereby when said vehicle approaches said device, said blade height adjustment means contacts said vehicle roof before said scrapping blade and, once said scrapping blade begins scrapping said vehicle root said blade height adjustment means allows said blade lower peripheral edge to follow the contour of said vehicle roof while maintaining said predetermined blade spacing relative to said vehicle roof.

3. A device as recited in claim 2 wherein said blade height adjustment means includes a height adjustment wheel defining a wheel circumferential surface;
   said height adjustment wheel being rollably attached to said scrapping blade so as to extend from said scrapping blade in a direction opposite said predetermined vehicle direction;
   said height adjustment wheel being sized and positioned so that when said wheel circumferential surface contacts said vehicle root said height adjustment wheel lifts said scrapping blade away from said vehicle roof so as to maintain said predetermined blade spacing between said blade lower peripheral edge and said vehicle roof.

4. A device as recited in claim 2 further comprising a breaking assembly for breaking slabs of hardened snow and ice supported on said vehicle roof, said breaking assembly being attached to said supporting assembly.

5. A device as recited in claim 4 wherein said breaking assembly is positioned so that when said vehicle is moved relative to said scrapping blade in said predetermined vehicle direction said breaking assembly precedes said scrapping blade along said vehicle roof.

6. A device as recited in claim 4 wherein said breaking assembly is provided with a breaking assembly height adjustment means for adjusting the height of said breaking assembly whereby said breaking assembly height adjustment means allows said breaking assembly to be selectively put into contact with said vehicle roof and to selectively follow the contour of said vehicle roof.

7. A device as recited in claim 4 further comprising a breaking assembly pressure adjustment means for adjusting the amount of pressure exerted by said breaking assembly on said vehicle roof.

8. A device as recited in claim 7 wherein said breaking assembly pressure adjustment means includes a braking assembly counterweight system.

9. A device as recited in claim 4 wherein said breaking assembly includes a breaking roller rotatably attached to said supporting assembly, said breaking roller defining a generally radially extending breaking blade.

10. A device as recited in claim 1 wherein said blade height adjustment means includes a skate component extending from said blade lower peripheral edge, said skate component defining a gliding surface for gliding on said vehicle roof, said skate component being configured and sized so as to maintain said predetermined blade spacing between said blade lower peripheral edge and said vehicle roof as said gliding surface glides on said vehicle roof.

11. A device as recited in claim 1 further comprising a blade pressure adjustment means for adjusting the amount of pressure exerted by said scrapping assembly on said vehicle roof.

12. A device as recited in claim 11 wherein said blade pressure adjustment means includes a blade counterweight system.

13. A device as recited in claim 12 wherein said blade counterweight system includes a blade adjustable weight attached to a first end of a blade counterweight cable, the second end of said blade counterweight cable being attached to said scrapping assembly, said blade counterweight system also including a blade pulley system for orienting said blade counterweight cable so that the tension created in said blade counterweight cable by said adjustable weight pulls said scrapping assembly upwardly so as to reduce the amount of pressure exerted by said scrapping assembly on said vehicle roof.

14. A device as recited in claim 1 wherein said scrapping assembly further includes a substantially resilient skirt extending from said scrapping blade so as to fill said predetermined blade spacing and so as to contact said vehicle roof when said scrapping assembly scrapes said vehicle roof.

15. A device as recited in claim 1 further comprising a breaking assembly for breaking slabs of hardened snow and ice supported on said vehicle roof, said breaking assembly including a breaking roller rotatably attached to a breaking roller arm, said breaking roller arm being pivotally attached to said supporting assembly, said breaking roller defining a set of generally radially extending breaking blades;
   said breaking assembly being provided with a breaking assembly height adjustment means for adjusting the height of said breaking assembly; said breaking assembly being also provided with a breaking assembly pressure adjustment means for adjusting the amount of pressure exerted by said breaking assembly on said vehicle roof, said breaking assembly pressure adjustment means including a breaking assembly counterweight system.

16. A device as recited in claim 1 further comprising a manual overriding means for allowing manual overriding of the automatic height adjustment provided by said blade height adjustment means.

17. A device as recited in claim 1 wherein said supporting assembly includes
   a supporting frame, said supporting frame including a pair of generally vertically oriented frame posts, said frame posts being anchored to said ground surface and horizontally spaced relative to each other so as to allow through passage of said vehicle therebetween;
   a blade carriage attached to said scrapping assembly, said blade carriage being slidably mounted between said frame posts;
   a carriage guiding means positioned between said frame posts and said blade carriage for guiding the vertical movement of said blade carriage along said frame posts while reducing the friction between said blade carriage and said frame posts.

18. A device for removing snow accumulation from a vehicle roof, said vehicle roof being part of a vehicle, said vehicle being supported on a ground surface, said device comprising:
   a scraping assembly for scrapping said snow accumulation from said vehicle roof, said scrapping assembly including a scrapping blade, said scrapping blade defining a blade lower peripheral edge;
   a supporting assembly linked to said scrapping assembly for adjustably supporting said scrapping assembly at a distance relative to said ground surface such that said vehicle roof can be positioned underneath said scrapping blade;
   a breaking assembly for breaking slabs of hardened snow and ice supported on said vehicle roof, said breaking assembly being attached to said supporting assembly.

19. A device as recited in claim 18 wherein said breaking assembly is positioned so that when said vehicle is moved relative to said scrapping blade in said predetermined vehicle direction said breaking assembly precedes said scrapping blade along said vehicle roof.

20. A device as recited in claim 18 wherein said breaking assembly is provided with a breaking assembly height adjustment means for adjusting the height of said breaking assembly whereby said breaking assembly height adjustment means allows said breaking assembly to be selectively put into contact with said vehicle roof and to selectively follow the contour of said vehicle roof.

* * * * *